US007724256B2

(12) United States Patent
Grady et al.

(10) Patent No.: US 7,724,256 B2
(45) Date of Patent: May 25, 2010

(54) FAST GRAPH CUTS: A WEAK SHAPE ASSUMPTION PROVIDES A FAST EXACT METHOD FOR GRAPH CUTS SEGMENTATION

(75) Inventors: Leo Grady, Yardley, PA (US); Chenyang Xu, Allentown, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 615 days.

(21) Appl. No.: 11/374,741

(22) Filed: Mar. 14, 2006

(65) Prior Publication Data
US 2006/0214932 A1 Sep. 28, 2006

Related U.S. Application Data

(60) Provisional application No. 60/663,845, filed on Mar. 21, 2005.

(51) Int. Cl.
*G06T 11/20* (2006.01)
*G06K 9/34* (2006.01)
(52) U.S. Cl. .................. 345/440; 382/164; 382/173; 382/175
(58) Field of Classification Search ............ 382/164, 382/173, 175; 345/440
See application file for complete search history.

(56) References Cited

U.S. PATENT DOCUMENTS

| 5,065,439 | A * | 11/1991 | Takasaki et al. | 382/241 |
| 7,536,048 | B2 * | 5/2009 | Moravec et al. | 382/164 |
| 2004/0013305 | A1 | 1/2004 | Brandt et al. | |
| 2005/0110878 | A1 * | 5/2005 | Dalton | 348/231.2 |
| 2005/0271273 | A1 * | 12/2005 | Blake et al. | 382/173 |
| 2006/0029275 | A1 * | 2/2006 | Li et al. | 382/173 |
| 2006/0045384 | A1 * | 3/2006 | De Haan | 382/299 |

OTHER PUBLICATIONS

Rother et al.; "GrabCut": Interactive Foreground Extraction Using Iterated Graph Cuts; Aug. 2004; ACM; vol. 23, Issue 3; pp. 309-314.*
Galun M et al: "Texture segmentation by multiscale aggregation of filter responses and shape elements" Proceedings of the Eight IEEE International Conference on Computer Vision. (ICCV). Nice, France, Oct. 13-16, 2003, International Conference on Computer Vision, Los Alamitos, CA : IEEE Comp. Soc, US, vol. vol. 2 of 2. Conf. 9, Oct. 13, 2003, pp. 716-723, XP010662432 ISBN: 0-7695-1950-4 * abstract, section 2, Table 1 *.
Sharon F et al: "Fast Multiscale Image Segmentation"Proceedings 2000 IEEE Conference on Computer Vision and Pattern Recognition. CVPR 2000. Hilton Head Island, SC, Jun. 13-15, 2000, Proceedings of the IEEE Computer Conference on Computer Vision and Pattern Recognition, Los Alamitos, CA IEEE Comp. So, vol. vol. 1 of 2, Jun. 13, 2000, pp. 70-77, XP001035589 ISBN: 0-7803-6527-5 * abstract, sections 2-3, Figs. 1-4 *.

(Continued)

*Primary Examiner*—Xiao M Wu
*Assistant Examiner*—David T Welch
(74) *Attorney, Agent, or Firm*—Donald B. Paschburg

(57) ABSTRACT

Traditional graph cuts provides a powerful method for producing semi-automatic image/volume segmentation, but often exceed available computer power. Multi-level methods for coarsening images/volumes are disclosed that allow for faster processing and creation of graph cuts segmentation without sacrificing quality of image. The disclosed graph cuts methods can be used at interactive speeds.

23 Claims, 8 Drawing Sheets

OTHER PUBLICATIONS

Geiger D et al: "Scaling images and image features via the renormalization group" Computer Vision and Pattern Recognition, 1993. Proceedings CVPR '93., 1993 IEEE Computer Society Conference on New York, NY, USA Jun. 15-17, 1993, Los Alamitos, CA, USA,IEEE Comput. Soc, Jun. 15, 1993, pp. 47-53, XP010095867 ISBN: O-8186-3880-X * abstract, sections 1,2.1,FIgs. 1-5 *.

Kropatsch Walter G ; Haxhimusa YLL: "Grouping and Segmentation in a Hierarchy of Graphs" Proc SPIE Int Soc Opt Eng; Proceedings of SPIE—The International Society for Optical Engineering; Computational Imaging II 2004, vol. 5299, Jan. 19, 2004,—Jan. 20, 2004 pp. 193-204, XP009069135 San Jose, CA, United States * abstract, sections 5.2, 6 *.

Malik J et al: "Contour and Texture 1,12 Analysis for Image Segmentation" International Journal of Computer Vision, Kluwer Academic Publishers, Norwell, US, vol. 43, No. 1, 2001, pp. 7-27, XP009039552 ISSN: 0920-5691 abstract, section 5.3 *.

* cited by examiner

FAST GRAPH CUTS: A WEAK SHAPE ASSUMPTION PROVIDES A FAST EXACT METHOD FOR GRAPH CUTS SEGMENTATION

STATEMENT OF RELATED CASES

This application claims the benefit of U.S. Provisional Application No. 60/663,845, filed Mar. 21, 2005, which is incorporated herein by reference.

BACKGROUND OF THE INVENTION

This invention relates to systems and methods for processing digital images. More specifically it relates to a method of image segmentation based on graph cuts that is useful for separating an object of interest in an image from the background of that object in the image. Object segmentation by finding their precise boundaries in images is well known. Different segmentation methods, including graph cuts, are well known. The graph cuts segmentation method has proven to be highly accurate in object segmentation. Applications that can strongly benefit from methods that can reliably segment out objects in images by finding their precise boundaries are in the field of medical imaging and medical diagnosis. Unsegmented images may present the viewer with overwhelming quantities of information that would make it difficult to focus on relevant parts of these images. Precise segmentation of images of organs from their background will make a potential diagnosis more reliable and easier to achieve and allows for precise volume measurements of objects such as tumors.

Graph cuts is an effective method of image segmentation that is described publicly in Y. Boykov and M.-P. Jolly, "Interactive organ segmentation using graph cuts:" in Medical Image Computing and Computer-Assisted Intervention, Pittsburgh, Pa., October 2000, pp. 276-286. Another description can be found in Y. Boykov and M.-P. Jolly "Interactive graph cuts for optimal boundary & region segmentation of objects in N-D images," in International Conference on Computer Vision, vol. 1, July 2001, pp. 105-112. The method of GRAPH CUT segmentation inputs two groups of "seeds" which are obtained either interactively or automatically into a multi-dimensional (2D or higher) image comprised of pixels or voxels, indicating that some voxels are "object" and others are "background". The algorithm then proceeds to label the remaining (i.e., unlabeled) voxels as either object or background. This output is obtained by treating the volume as a graph where each voxel in a volume is associated with a node and a lattice-based neighborhood structure is imposed. By weighting the edges in the graph in accordance with intensity differences (or a model of the object boundary), the smallest cut is found between the known object/background seeds using the max-flow/min-cut algorithm developed in Y. Boykov and V. Kolmogorov, "An experimental comparison of min-cut/max-flow algorithms for energy minimization in vision, IEEE transactions on Pattern Analysis and Machine Intelligence, vol. 26, no. 9, pp. 1124-1137, September 2004.

Although the algorithm has proven effective at volume segmentation, and has continued to find application in recent work such as U.S. patent application Ser. No. 11/313,102, filed Dec. 20, 2005, which is hereby incorporated by reference, the speed and memory consumption required for evaluating large volumes continues to be problematic. One approach for overcoming this problem is to diminish the demand for computing resources in determining the graph cuts by down-sampling the to be segmented volume. This may include a method to produce coarse-level volumes that the graph cuts segmentation algorithm could be applied to. Although such an approach overcomes the speed/memory consumption problem by operating on effectively a smaller volume, it was up till the present invention unclear how to translate the coarsened solution to the original resolution volume such that the solution so obtained has a comparable quality as if the graph cuts algorithm were applied directly to full-resolution volume.

Accordingly, new and improved methods and systems are required that will create more rapid graph cuts on coarsened and thus smaller volumes with the same quality as a full-resolution volume graph cuts of an image.

SUMMARY OF THE INVENTION

Graph cut methods are known to provide good quality object segmentation in complex images such as used in medical applications. Current computer processing capabilities may not be sufficient for executing interactive, high-quality graph cut algorithms for large data volumes. Coarsening the volume can reduce the required computer power.

One aspect of the present invention provides a method of segmenting an object from a background in an image, the image being 2D, 3D or N-D by graph cuts methods, reducing the number of calculations by coarsening the image volume.

It is preferred not to lose quality of the image by the coarsening process. In accordance with another aspect of the present invention the conditions are provided that allow maintaining the quality and resolution of the segmented coarsened object. These conditions are called Maximally Connected Neighbor (or MCN) requirements.

Consecutive coarsening steps may be applied to further reduce computing requirements. In accordance with a further aspect of the present invention a multi-level coarsening method is provided.

One may want to stop coarsening when further coarsening will affect the resolution of the segmentation. In accordance with a further aspect of the present invention a method is provided to halt further coarsening when MCN requirements are not longer met.

After creating the coarse volume the graph cuts problem can be solved by applying any of the known graph cuts methods. From the coarse graph cuts a fine-level graph cuts needs to be created. In accordance with a further aspect of the present invention a method is provided to assign coarse-level labels to fine-level nodes without affecting the quality of the object segmentation.

It is another aspect of the present invention to provide a program storage device readable by machine, tangibly embodying a program of instructions executable by the machine to perform the graph cuts method steps for segmenting one or more objects from one or more backgrounds that are the object of the present invention.

In accordance with one aspect of the present invention, a method of processing a set of image data is provided. The set of image data has a first plurality of nodes. A measure of affinity between neighboring nodes in the first plurality of nodes is generated. This affinity is generated using a weighting function. The first set of image data is downsampled to generate a second plurality of nodes such that the second plurality of nodes is less than the first plurality of nodes. A measure of affinity between neighboring nodes in the second plurality of nodes is determined. The measure of affinity between neighboring nodes in the second plurality of nodes is based on the measure of affinity between neighboring nodes in the first plurality of nodes.

In accordance with a further aspect of the present invention, the method further includes processing the second plurality of nodes to generate information about the set of image data. The processing can be performed to segment an object in the set of image data. In accordance with another aspect of the present invention, graph cuts can be used to process the second plurality of nodes to segment an object in the set of image data.

DESCRIPTION OF A PREFERRED EMBODIMENT

The present invention is applied for rapidly separating an image object from its background by producing semi-automated image/volume segmentations that are to be used at interactive speeds. The volumes of "object" and "background" in an image are created by placing seeding points in those areas and providing them with the labels "background" or "object". The seeding points will be applied to form graph representations of connected voxels wherein the voxels are the nodes and a quantified property of the connected voxels will define the "cost" of the edges of the graph. Graph cuts will be created by selecting a boundary of minimal "cost". The presence of many voxels will exponentially grow the number of connected nodes in a graph and will make the process of calculating a minimum cost boundary time and resource consuming. One may down-sample or coarsen the description of a volume lattice, thus reducing the number of connected nodes and the resource and time requirements for calculating the optimal graph cuts. It is one aspect of the present invention to provide methods for coarsening images/volumes by reducing the lattice describing the image volume. One can anticipate that certain details in an image may get lost in the coarsening or downsampling process. It is another aspect of the present invention to provide multilevel coarsening methods to improve the speed of applying graph cuts without sacrificing quality of results. Under certain conditions of the properties of the shape of the object the graph-cuts applied to a coarsened volume will generate the identical results, but at a lower effort, as applied to a fine-lattice volume. It is a further aspect of the present invention to provide the conditions under which the results of graph cuts of a coarsened lattice are identical to those obtained on the fine-level lattice. The conditions are based on the assumption of mild shape regularity of the image object. Another condition is that the object is not too thin for coarsening.

The definition of a graph as applied in the present invention is based on the book by F. Harasy, entitled: Graph Theory. Addison-Wesley, 1994. According to this book a graph consists of a pair $G=(V, E)$ with vertices (nodes) $v \in V$ and edges $e \in E \subseteq V \times V$. V. An edge e, spanning two vertices, $v_i$ and $v_j$ is denoted by $e_{ij}$. A weighted graph assigns a value to each edge called a weight. The weight of an edge, $e_{ij}$, is denoted by $w(e_{ij})$ or $w_{ij}$ and is assumed here to be nonnegative and real. The degree of a vertex is $d_i = \Sigma w(e_{ij})$ for all edges $e_{ij}$ incident on $v_i$. The following description will also assume that the graph is connected. In the present context, a node corresponds to a voxel (pixel) and an edge to a connection between neighboring nodes on a lattice. Graph partitioning assigns each node to a set of foreground voxels, F, or background voxels, B, such that $F \cup B = V$, $F \cap B = \emptyset$.

Figure 1:
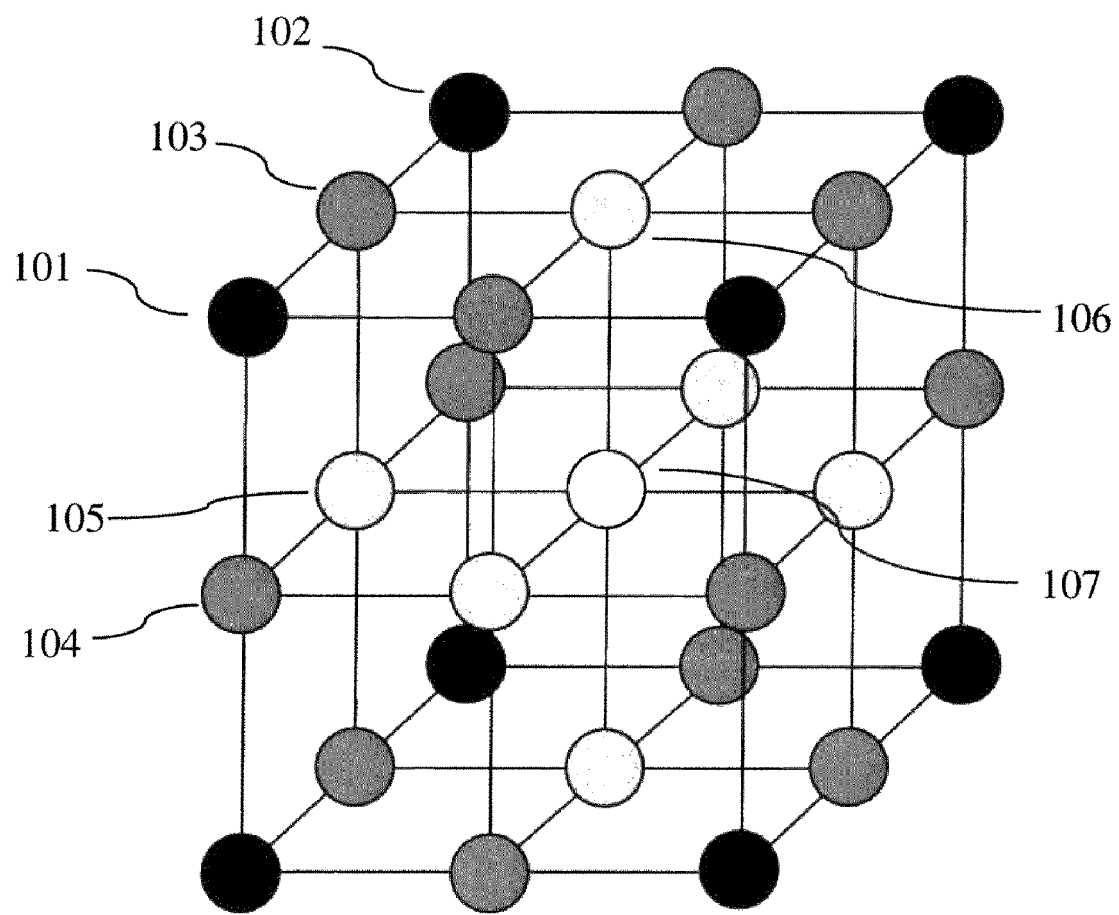
FIG. 1 shows a diagram of part of an image volume with coarse-lattice neighbors.

The evaluation of graphs will presently be limited to 4- or 8-connected lattices in 2D and 6-, 10- or 26-connected lattices in 3D. On a lattice, we will define The coarsening method of the present invention will be defined by first writing each node in terms of its 2D or 3D coordinates by starting with (0,0,0) and moving in the positive directions. A node is defined as belonging to the k-th order distance set, $N^k \subset V$, if the number of odd digits in its coordinates are equal to k. The coarse sampling set may be viewed as $N^0$. In 2D, $(N^0 \cup N^1 \cup N^2) = V$ and in 3D $(N^0 \cup N^1 \cup N^2 \cup N^3) = V$. An example is shown in FIG. 1. A node in the $N^k$th distance set will be referred to as a kth-order neighbor of a coarse node.

Now referring to FIG. 1 describing coarse-lattice neighbors. FIG. 1. shows a diagram of a coarse sampled lattice. Black nodes such as 101 and 102 in FIG. 1. correspond to coarse-lattice samples; dark gray nodes such as 103 and 104 correspond to first order neighbors; light-grey nodes such as 105 and 106 correspond to $2^{nd}$ order neighbors and white nodes such as 107 correspond to $3^{rd}$ order neighbors. The Maximally Connected Neighbor rule states that a $1^{st}$ order neighbor must take the same label as its most strongly connected or weighted coarse-lattice neighbor. Similarly, a $2^{nd}$ order neighbor must take the same label as its most strongly connected $1^{st}$ order neighbor and a $3^{rd}$ order neighbor must take the same label as its most strongly connected $2^{nd}$ order neighbor.

Shape Assumption

Iteratively downsampling a volume will eventually obscure the details of the object in question. The limit of downsampling the volume to a single voxel removes any image structure that was present initially. However, it is apparent that downsampling a volume containing a small, elongated, object will more quickly lose the resolution sufficient to represent the object. In contrast, one may downsample a volume containing a large, round object with much less concern. Specifically, we want to assume that the shape of our object does not have the problem illustrated in FIG. 2 and FIG. 3.

Figure 2:
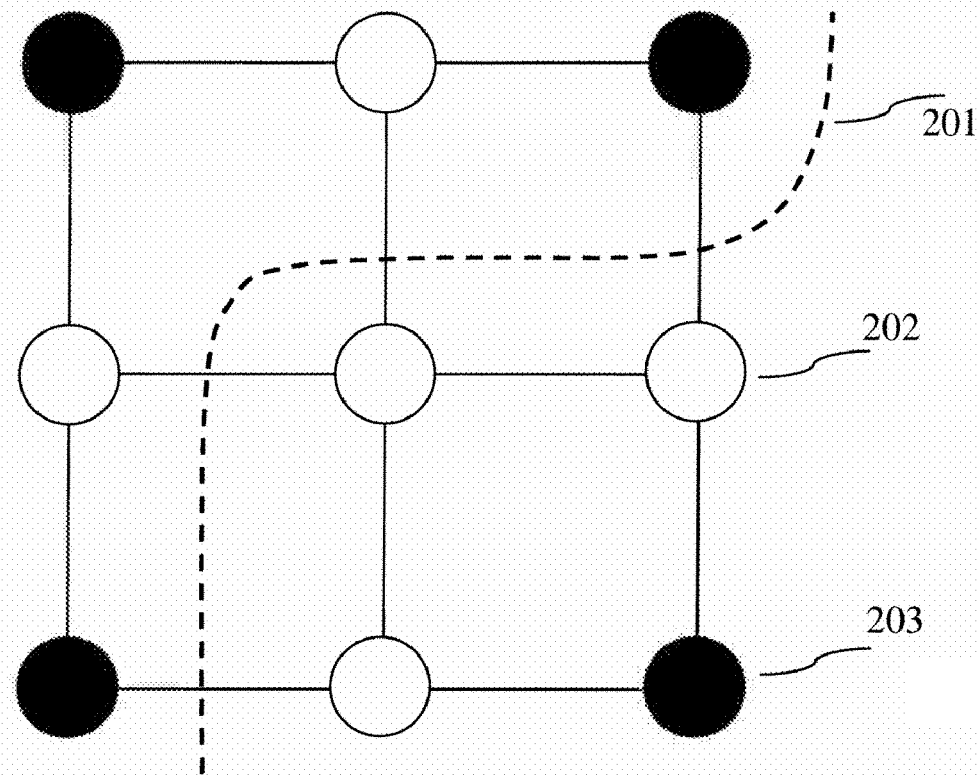
FIG. 2 is a diagram showing an acceptable coarsening shape in a 2D lattice.
Figure 3:
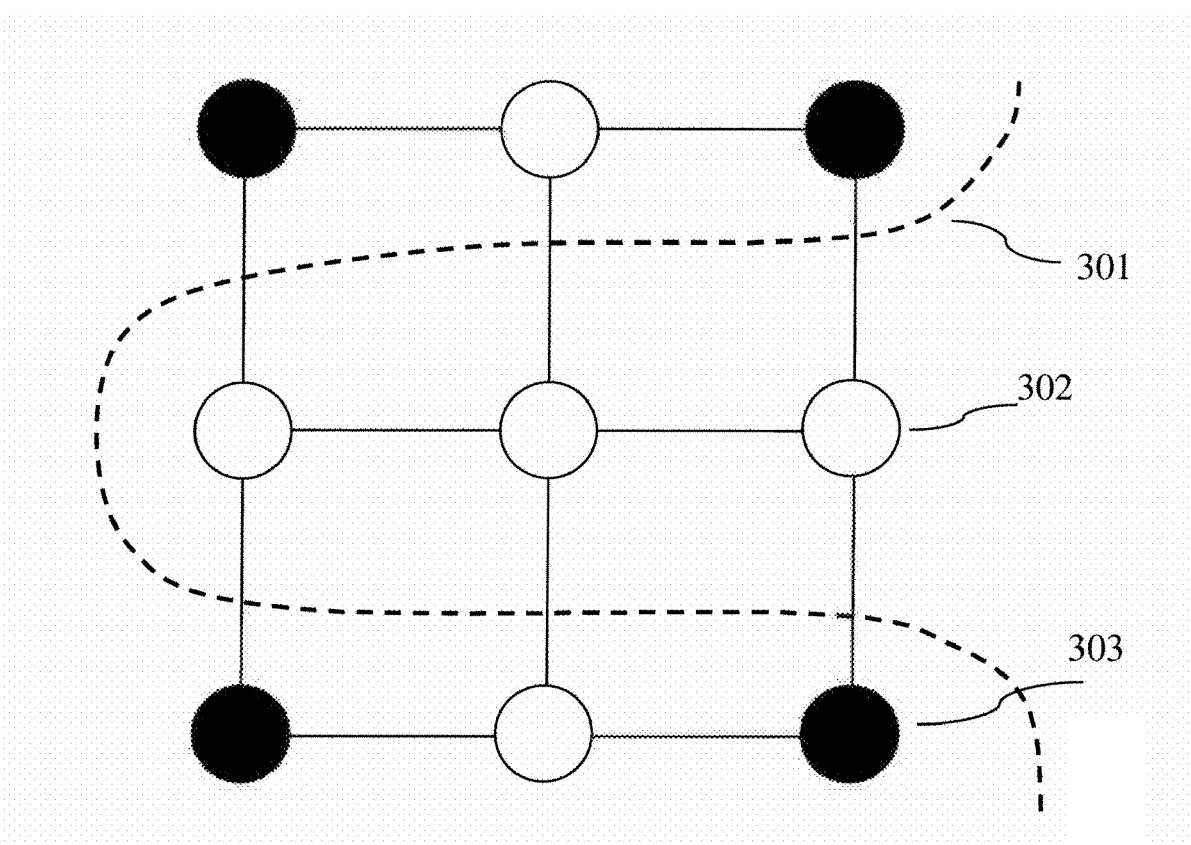
FIG. 3 is a diagram showing an unacceptable coarsening shape in a 2D lattice.

Now referring to FIG. 2 and FIG. 3, FIG. 2 shows a diagram of an acceptable shape of part of an object in 2D as an illustrative example. FIG. 3 shows a diagram of an unacceptable shape in 2D. The open circles such as 202 in FIGS. 2 and 302 in FIG. 3 represent fine-lattice nodes (pixels), the filled circles such as 203 in FIGS. 2 and 303 in FIG. 3 represent the coarse-lattice nodes. The dashed line 201 in FIG. 2 and dashed line 301 in FIG. 3 indicate the boundary of the object that is to be represented on the coarse lattice. It is assumed that the object is thick enough to be represented by one of the coarse-lattice nodes. Given this assumption, the fine-lattice solution may be determined exactly by applying graph-cuts to the appropriately coarsened lattice. It is noted that this illustrated concern about the shape is similar to the concern expressed in X. Han, C. Xu, and J. L. Prince, "A topology preserving level set method for geometric deformable models," IEEE transactions on Pattern Analysis and Machine Intelligence, vol. 25, no. 6, PP. 755-768, June 2003.

To prevent these shape problems, it is assumed that downsampling continues if a segmentation target (i.e., object) satisfies the following conditions, which are an aspect of the present invention:

1) Each kth-order neighbor takes the same label on the fine lattice as its most strongly connected (k−1)th-order neighbor,
2) If a kth-order neighbor is equally connected to multiple (k−1)th-order neighbors, it must take the label of one of these neighbors, but it is irrelevant which one.

Label of a voxel means the decision that a voxel belongs to foreground or background. The most strongly connected (k−1)th-order neighbor of a node is defined to be that neighbor for which the node has the largest edge weight connecting it. The term used for the above requirements and aspect of the present invention is the Maximally Connected Neighbor requirements (MCN). It will also be used to describe the most strongly connected (k−1)th-order neighbor of a node. The most strongly connected neighbor of a node in $N^0$ is defined to be itself.

Coarsening Strategy

Define the binary solution vector, x, as $$x = \begin{cases} 1 \text{ if } v_i \in F, \\ 0 \text{ if } v_i \in B, \end{cases} \quad (1)$$

and the graph Laplacian as $$L_{v_i v_j} = \begin{cases} d_{v_i} & \text{if } i = j \\ -w_{ij} & \text{if } v_i \text{ and } v_j \text{ are adjacent nodes} \\ 0 & \text{otherwise} \end{cases} \quad (2)$$

where $L_{v_i v_j}$ is used to indicate that the matrix L is indexed by vertices $v_i$ and $v_j$. Weights are typically derived from the image intensities via an equation such as $$w_{ij} = \exp(-\beta(g_i - g_j)^2), \quad (3)$$

where $g_i$ indicates the image intensity at pixel i and $\beta$ represents a free parameter.

Given weights derived from the image and a subset of the nodes fixed by the seeds to foreground or background, the graph cuts algorithm obtains a full segmentation by minimizing $$E(x) = x^T L x. \quad (4)$$

Given a set of coarse nodes, $c_t \in N^0$, define the MCN projection operator as:

$$P_{v_i c_j} = \begin{cases} 1 & \text{if } v_i = c_j, \\ 1 & \text{if } c_i \text{ is the MCN of } v_j, \\ 0 & \text{else.} \end{cases} \quad (5)$$

In the case of a tie for maximal neighbors of a node, $v_j$, described in the MCN conditions, a single '1' is placed in the jth column at a row corresponding to any one of its maximally connected neighbors. The MCN conditions on the object shape may now be written algebraically by requiring that the fine-level segmentation is simply a projection of the coarse-level segmentation, i.e., $$P x_c = x \quad (6)$$

It is noted that P may be viewed as an agglomerative prolongation operator in the context of traditional multigrid approaches such as described in U. 'Trottenberg, C. W. Oosterlee, and A. Schuller, Eds., Multigrid. San Diego: Academic Press, 2000. Substituting (6) into the original graph cuts formulation of (4) yields $$E(x_c) = x_c^T P^T L P x_c = x_c^T L_c x_c, \quad (7)$$

which is simply another graph cuts problem, provided that $L_c$ may be shown to be the Laplacian matrix of another graph. In fact, this is true in an even stronger sense—In 2D, a 4- or 8-connected lattice will become an 8-connected lattice on the coarse lattice and in 3D, a 6-, 10- or 26-connected lattice will become a 26-connected lattice on the coarse lattice. The benefit of this higher-level connectivity structure is that a standard, regular, data representation may be used for all levels (i.e., an 8-connected lattice in 2D and a 26-connected lattice in 3D). Although coarsening strategies have been explored in the past for graph-based algorithms (specifically, Markov Random Fields), the explosion of non-local connectivity at high levels has made these approaches less attractive, as described in J B. Gidas, "A renormalization group approach to image processing problems," IEEE transactions on Pattern Analysis and Machine intelligence, vol. 11, no. 2, pp. 164-180, February 1989; and P. Perez and F. Heitz, "Restriction of a Markov random field on a graph and multiresolution statistical image modeling:" IEEE Trans. on Information Theory, vol. 42, no. 1, pp. 180-190, January 1996.

Coarse Graphs

It will be shown that the coarsened matrix $P^T L P$ is, in fact, the Laplacian matrix for some graph. It has been known in N. Biggs, Algebraic Graph Theory, ser. Cambridge Tracts in Mathematics. Cambridge University Press, 1974, no. 67 that any graph Laplacian may be decomposed into $$L = A^T C A \quad (8)$$

where C is an m×m diagonal matrix, indexed by edge, $e_i$, such that $C_{ii} = w_i$ and A is the m×n edge-node incidence matrix defined as $$A_{e_{ij} v_k} = \begin{cases} +1 & \text{if } i = k, \\ -1 & \text{if } j = k, \\ 0 & \text{otherwise,} \end{cases} \quad (9)$$

for every vertex $v_k$ and edge $e_{ij}$, where $e_{ij}$ has been arbitrarily assigned an orientation. Note that neither P or A contain information about the edge weights. Therefore, if B=AP is an incidence matrix for some graph, then $$L_c = P^T L P = P^T A^T C A P = B^T C B, \quad (10)$$

is also a graph Laplacian, which is necessarily isomorphic to a graph as is shown in: N. Biggs, Algebraic Graph Theory, ser. Cambridge Tracts in Mathematics. Cambridge University Press, 1974, no. 67 (i.e., the matrix is a unique representation of a graph).

This result follows from the following lemma:

Lemma 1: For m×n incidence matrix A and n×q matrix H, the product B=AH is an incidence matrix if H is a binary matrix (i.e., all values are zero or one) where each row has one and only one nonzero entry.

Proof: A matrix is an incidence matrix if each row has no greater than one $\{-1, 1\}$ pair, with all other entries being zero. Consider the ith row of A, $\alpha_i$, which must contain either all zeros or a single $\{-1, 1\}$ pair. If all zeros, then the corresponding row of B, $B_i$ is all zeros. If there is a $\{-1, 1\}$ pair, denote the nonzero entries by $A_{ij}$ and $A_{ik}$, respectively. Since each row of H contains a single '1', then $B_i$ will either be all zeros (if $H_{js}=H_{ks}=1$ for some column s) or will contain a $\{-1, 1\}$ pair (if $H_{js}=H_{kr}=1$ for s≠r).

Practically, the coarsened weighting is straightforward to implement. Define the operator $M(v_i \epsilon N^k) = v_j \epsilon N^{k-1}$ that maps each kth-order neighbor node to its maximally connected neighbor and define $M^*(v_i \epsilon N^k) = v_j \epsilon N^0$ as the operator that produces a coarse node from k applications of M. Then, the weight between two coarse nodes on the upper-level graph is given by $$w_{ij} = \sum_{M^*(v_s)=v_i, M^*(v_q)=v_j, \forall v_s, v_j} w_{sq}, \quad (11)$$

Figure 4:
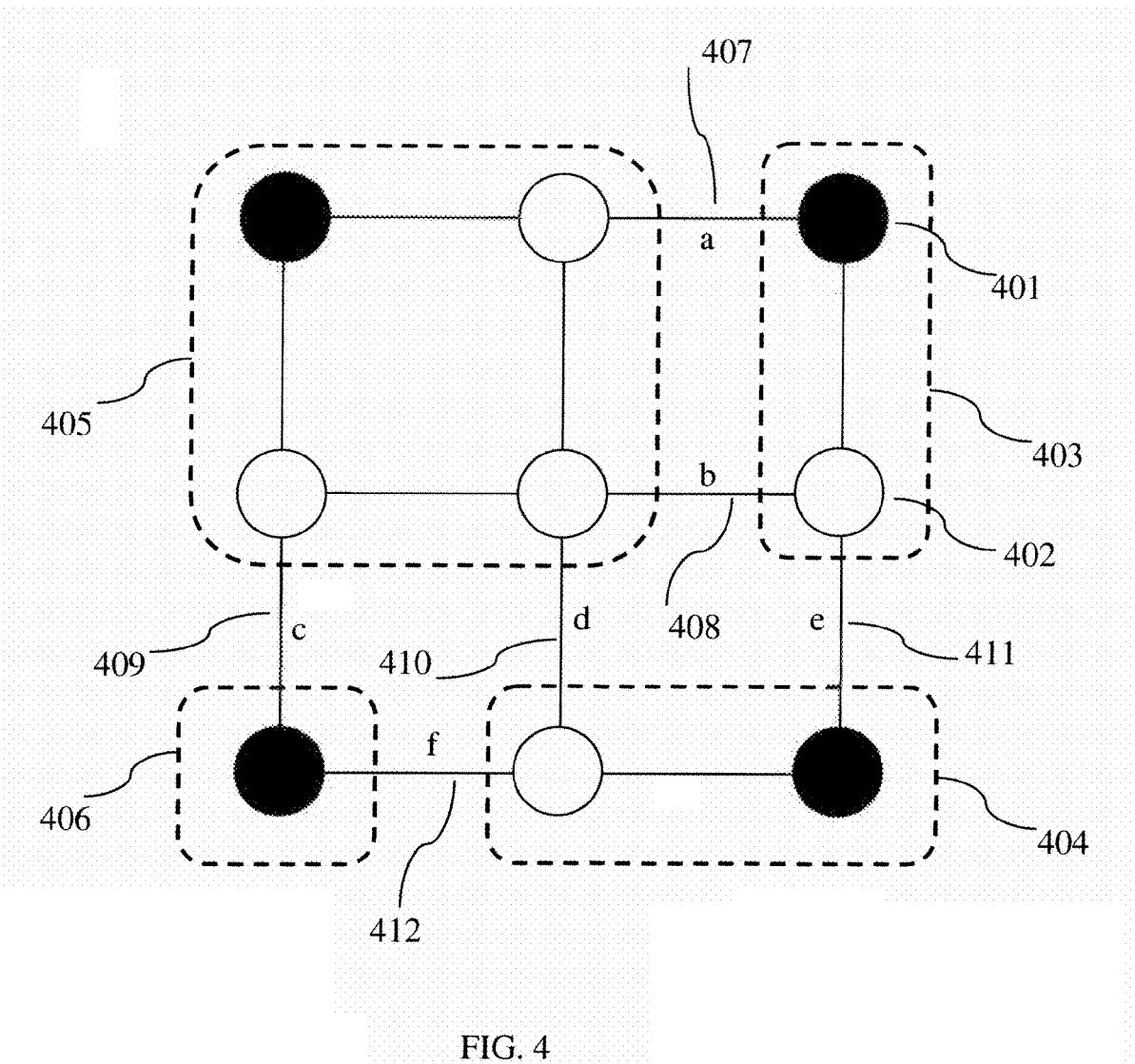
FIG. 4 is a diagram showing the coarsening weights in a fine lattice to a coarse lattice in 2D.

An illustrative example of the coarsening scheme is shown in FIG. 4.

Figure 5:
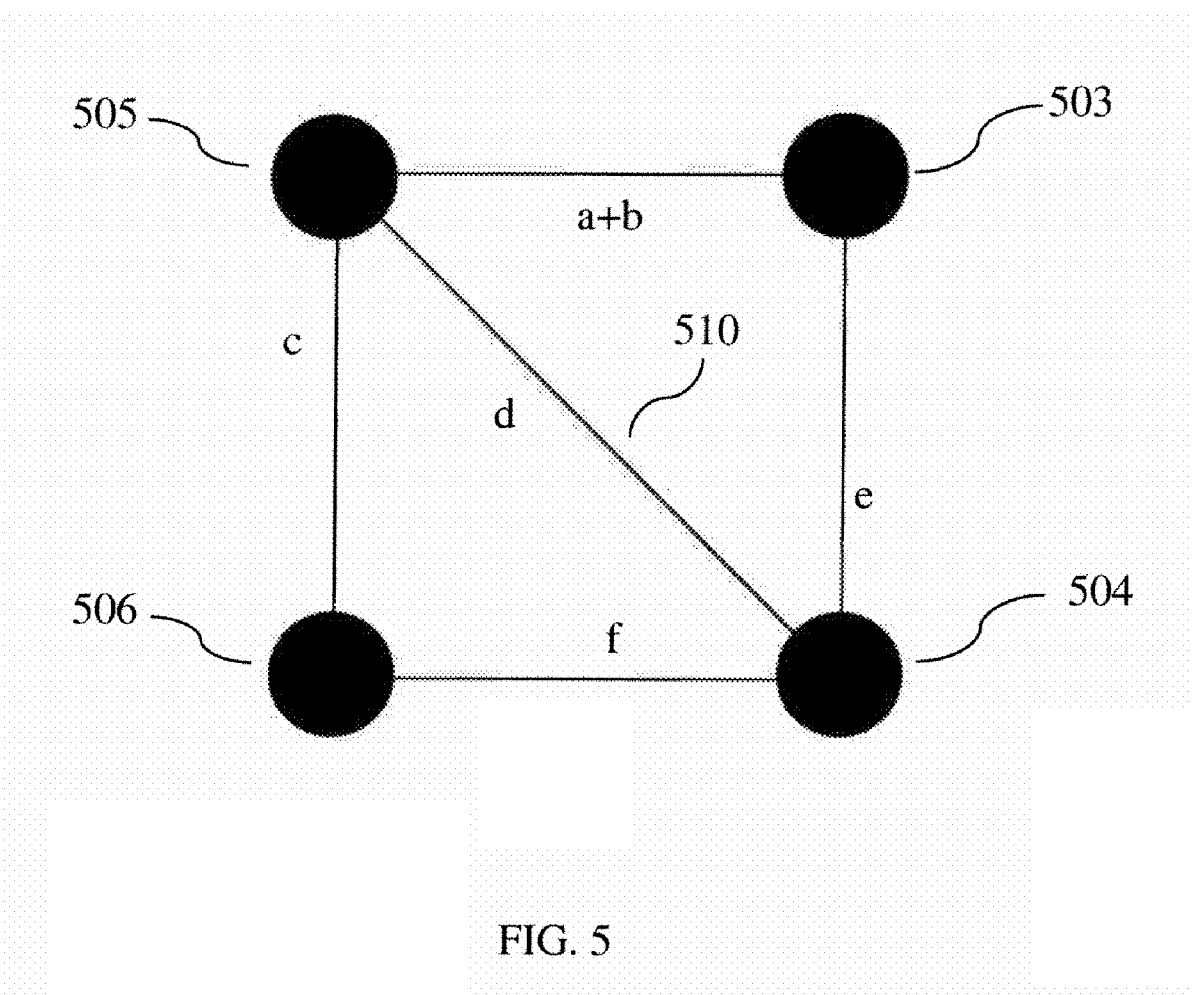
FIG. 5 is a coarse level diagram showing the coarse level weighting derived from a fine-level 2D lattice.

Now referring to FIG. 4, the diagram shows an example of how to coarsen weights from a fine lattice to a coarse lattice. Black circles such as 401 represent selected coarse nodes while open circles such as 402 indicate fine-level nodes. The dashed lines 403, 404, 405 and 406 indicate groups of fine-level nodes that have a common maximally connected neighbor. The connections between the groups of common maximally connected neighbors: 407, 408, 409, 410, 411 and 412 are named a, b, c, d, e and f respectively. The graph in FIG. 5 shows the coarse-level weighting derived from the fine-level MCN groupings in FIG. 4. The group 403 in FIG. 4 corresponds with 503 in FIG. 5; group 404 in FIG. 4 corresponds with 504 in FIG. 5; group 405 in FIG. 4 corresponds with 505 in FIG. 5 and group 406 in FIG. 4 corresponds with 506 in FIG. 5. Although a single diagonal edge 510 has been introduced in the coarse-level graph of FIG. 5, the coarse-level graphs will become no more than an 8-connected lattice (or a 26-connected lattice in 3D). Weights on internal edges in the MCN grouping have no influence on the coarse-level weighting and are therefore unlabeled to avoid confusion.

Referring to FIG. 4, the weights can be thought of as affinities between nodes. Thus, in FIG. 4, the affinity between node 401 and its neighbor in group 405 is "a" and the affinity between node 402 and its neighbor in group 405 is "b." After the grouping, as shown in FIG. 5, the affinity between node 505 (representing the group of nodes 405) and node 503 (representing the group of nodes 403) is the sum of the affinities between each of the nodes that have been included in the group 403 and each of the nodes that have been included in the group 405. Thus, the affinity between nodes 503 and 505 is "a+b".

By the same reasoning, the affinity between nodes 505 and 506 is the sum of the affinities between the nodes from FIG. 4 that are included in node 505 and the nodes from FIG. 4 that are included in node 506, in this case, "c."

The affinity between nodes 503 and 504 is the sum of the affinities between the nodes from FIG. 4 that are included in node 503 and the nodes from FIG. 4 that are included in node 504, in this case, "e." The affinity between nodes 506 and 504 is the sum of the affinities between the nodes from FIG. 4 that are included in node 506 and the nodes from FIG. 4 that are included in node 504, in this case, "f."

Diagonal affinities can also be created. Referring to FIG. 5, the affinity between nodes 505 and 504 is the sum of the affinities between the nodes from FIG. 4 that are included in node 505 and the nodes from FIG. 4 that are included in node 504, in this case, "d."

Thus, in accordance with an aspect of the present invention, the affinities between nodes from a prior step are used to determine the affinities between nodes generated in a downsampled step. The downsampled nodes can be used in further processing of the image, for example, by graph cuts to determine a segmentation of the image. This aspect of the present invention saves processing time and allows images to be processed and manipulated faster.

It is clear from equation (11) that the weight between two coarse nodes may be nonzero only if there exist two nodes, $v_i$ and $v_j$, such that $M^*(v_i) \neq M^*(v_j)$. A k-th order neighbor may be mapped to a set of $2^k$ coarse nodes through $M^*(v_i)$, which we may denote as the range of $v_i$ through $M^*$, $R(v_i)$. Given two neighboring nodes, $v_i$ and $v_j$, of kth and (k−1)th order respectively, we note that $R(v_j) \subset R(v_i)$. Therefore, opposite corners of a (k−1)th neighborhood may become connected with nonzero weights, corresponding to 8-connectivity in 2D and 26-connectivity in 3D (as illustrated in FIG. 4 and FIG. 5).

A seed on the fine level, $v_i$, induces a seed on the coarse node $M^*(v_i)$ with the same value (i.e., foreground or background). If two nodes, $v_i$, $v_j$, are seeds with opposite value (i.e., one seed represents foreground and the other background) and $M^*(v_i)=M^*(v_j)$, then the assumptions are violated for that coarsening and therefore the lattice should no longer be coarsened. Therefore, we do not treat this issue in any greater detail.

According to another aspect of the present invention the multilevel graph cuts algorithm may therefore be implemented by the following steps:

Step 1) Find M* of each node in the fine-level graph by examining kth-level neighbors from k=0 to k=K, where K represents the data dimension;

Step 2) Produce the weights for the coarse-level graph from equation (11), i.e., for every two neighbors with different M* nodes, add the weight between them to the weight between their M* nodes;

Step 3) Continue coarsening until the shape assumption would be violated (predetermined or guessed);

Step 4) Solve the graph cuts problem using any of the available methods; (for instance the method as described in Y. Boykov and V. Kolmogorov, "An experimental comparison of min-cut/max-flow algorithms for energy minimization in vision, *IEEE transactions on Pattern Analysis and Machine Intelligence*, vol. 26, no. 9, pp. 1124-1137, September 2004.)

Step 5) Propagate the determined foreground/background label to fine levels by assigning the coarse-level label to each node that was mapped by M* to that coarse node;

6) Continue propagating until fine-level resolution labeling is obtained.

Figure 6:
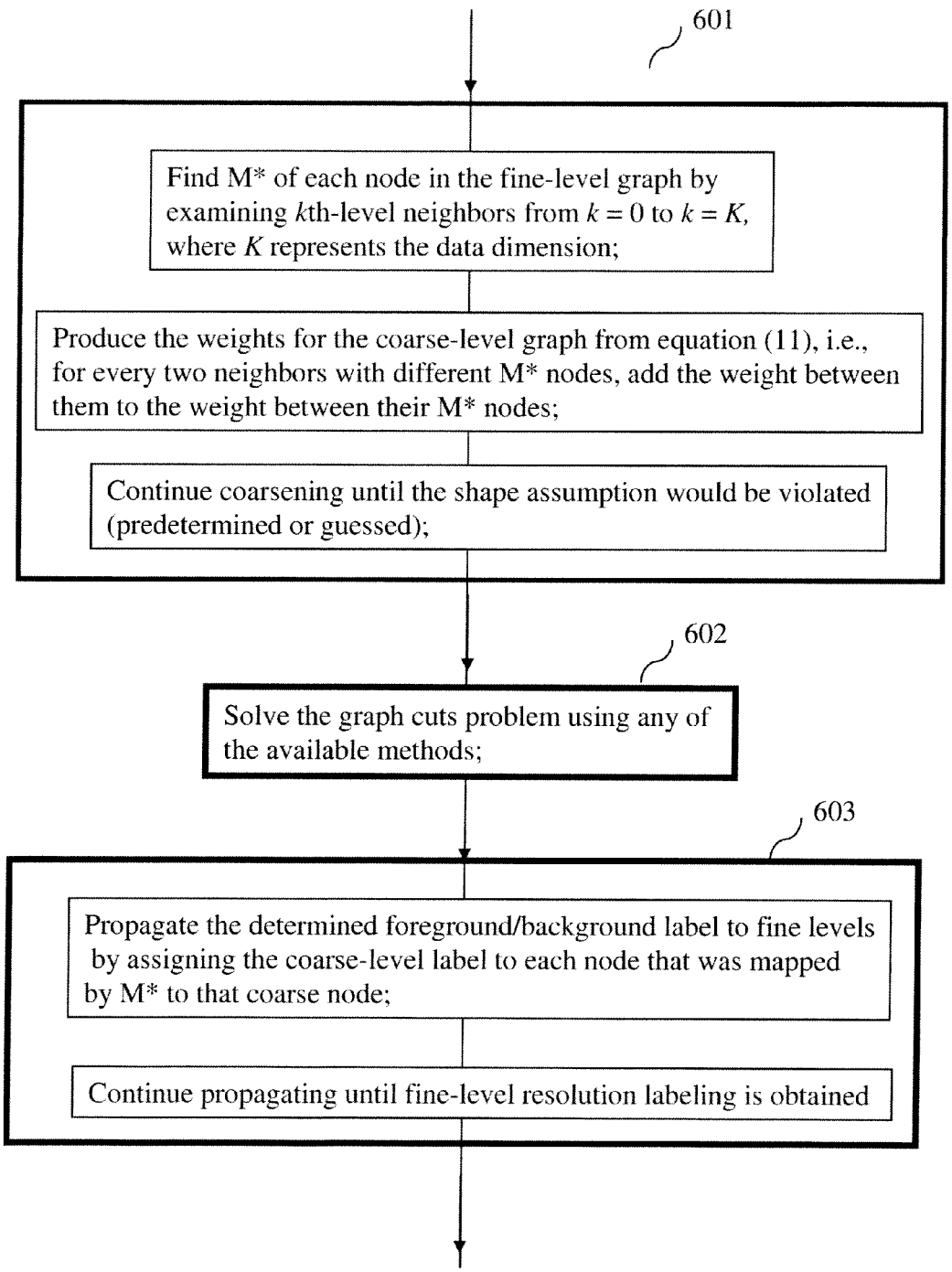
FIG. 6 is a flow diagram for achieving graph cuts based on coarsening methods.

The coarsening methods, followed by a graph cuts solution and assigning the appropriate object/background labels to the fine-lattice nodes to construct the high-quality object segmentation image, can be embodied in a computer device. The high level instruction flow of such an embodiment is shown in FIG. 6. Step 601 comprises the high level instructions for the coarsening process, while maintaining the same quality as a fine-level segmentation. Step 602 comprises the part of the process to solve the graph cuts based of the coarsened lattice. Step 603 comprises the process to label all the relevant voxels appropriately. From which the actual segmentation image can be generated.

Figure 7:
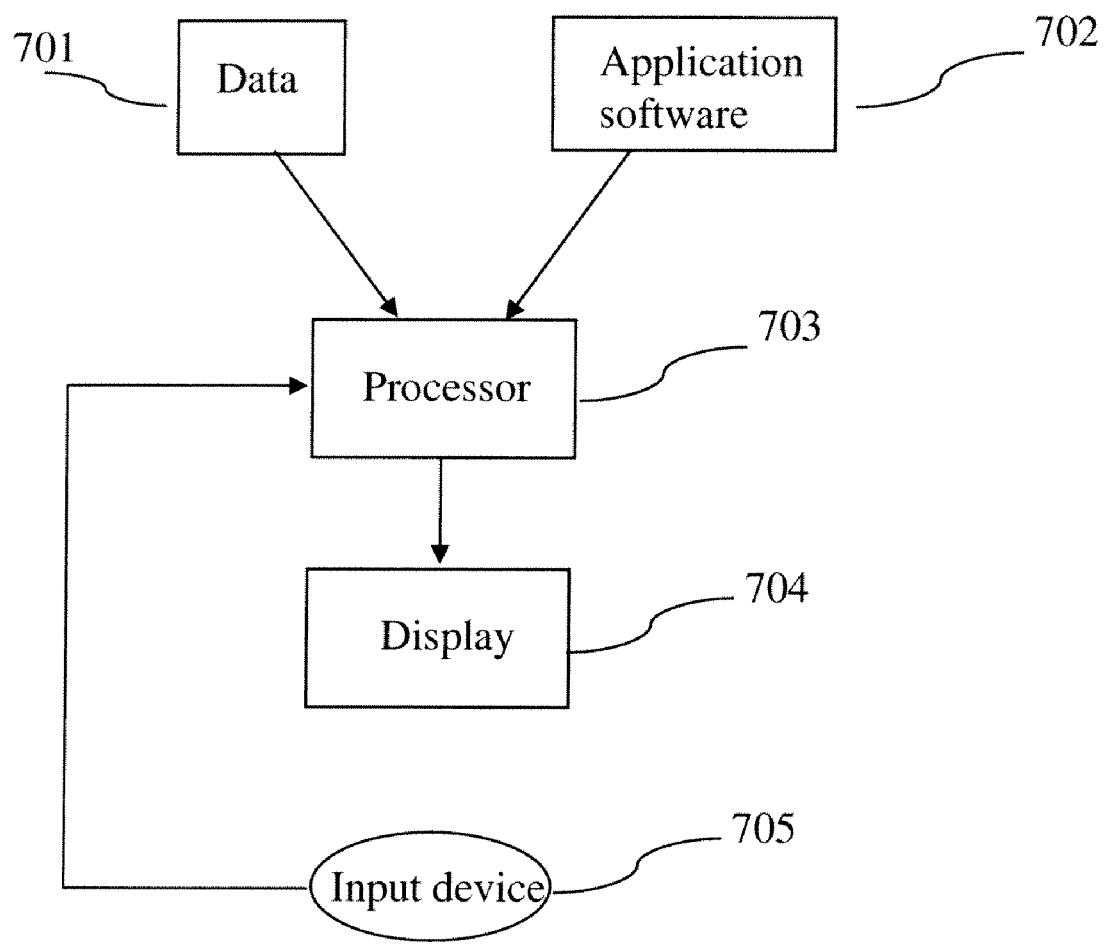
FIG. 7 is a diagram of a system for executing graph cuts segmentation.

The process steps as shown in FIG. 6 can be executed by a system as shown in FIG. 7. The system is provided with data 701 representing the image. An instruction set or program 702 representing the steps of FIG. 6 is provided and combined with the data in a processor 703, which can process the instructions of 702 applied to the data 701 and show the segmented image on a display 704. An input device 705 like a mouse, or track-ball or other input device allows a user to select the initial object and background for segmentation. Consequently the system as shown in FIG. 7 provides an interactive system for object segmentation from a background in an image by applying coarsening methods in graph cuts.

Figure 8:
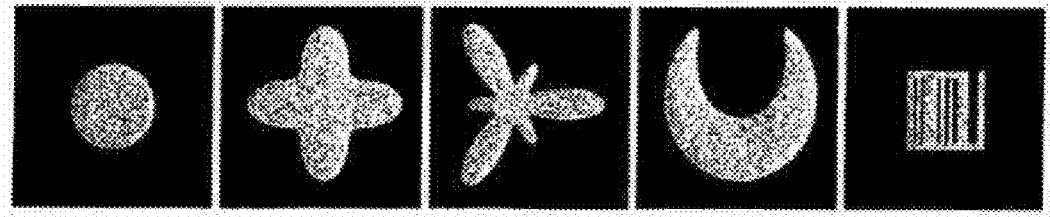
FIG. 8 is an original series of images with noise.
Figure 9:
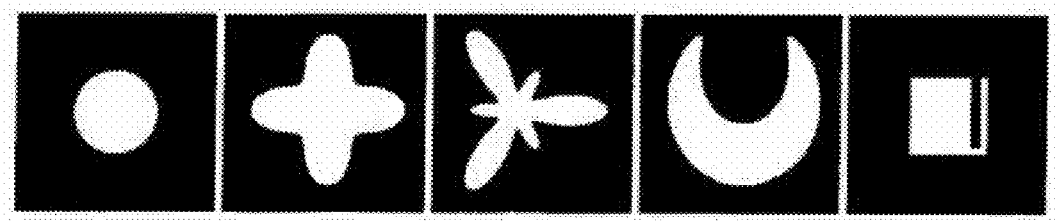
FIG. 9 is a fine-level graph cuts segmentation of the images of FIG. 8.
Figure 10:
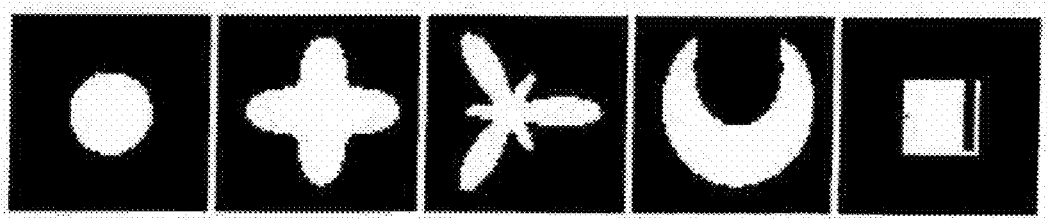
FIG. 10 is a coarse level graph cuts segmentation of the images of FIG. 9.
Figure 11:
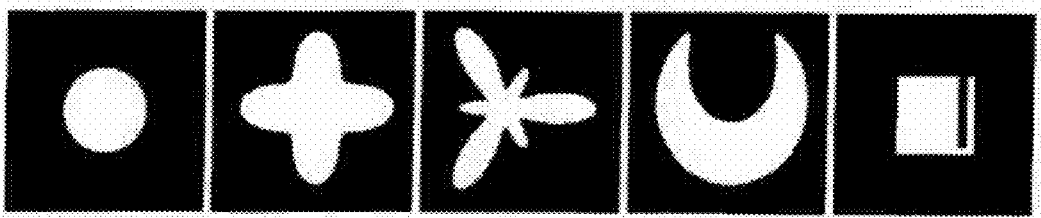
FIG. 11 is a high resolution segmentation generated from the segmentation of FIG. 10.

The coarsening method according to one aspect of the present invention has been applied to multilevel graph cuts of noisy images of several objects as an illustrative example. In this example a standard graph cuts will be compared with multilevel graph cuts. Now referring to FIGS. 8, 9, 10 and 11. FIG. 8 is an original image of a noisy figure. Seeds (not shown) are placed inside and outside the object. FIG. 9 is the image after application of standard graph cuts. FIG. 10 shows segmentation of the images of FIG. 8 on coarsest lattice after MCN coarsening. FIG. 11 shows the projection of coarse MCN solution to original resolution. There is zero difference between the solutions in FIG. 9 and FIG. 11, except that the speed of creating FIG. 11 is increased by over an order of magnitude compared to FIG. 9.

The illustrative example of an image of the objects in noise with two applications of graph cuts: a full resolution segmentation and the application of the present, multilevel graph cuts, using three levels demonstrate the correctness of the method. As expected, the segmentation obtained by the full resolution graph cuts and the multilevel graph cuts were identical, although the speed required to produce the multilevel graph cuts was over an order of magnitude faster. Traditional graph cuts methods provide an extremely powerful and effective method for producing semi-automated image/volume segmentations. Unfortunately, today's demands for quality, interactive-speed, processing of large data volumes outstrip the abilities of the graph cuts algorithm. In the present invention a simple, multilevel, methods for coarsening images/volumes has been introduced that allows fast application of graph cuts while not sacrificing any quality of result. In fact, it was shown that the results on the coarsened lattice are identical to those obtained on the fine-level lattice, provided that a mild shape-regularity assumption is satisfied. The requirements of the methods of the present invention demand that the object to be segmented not be too thin so as to slip between the coarsened nodes. Since the coarsening is a low-constant linear-time operation, the graph cuts may now be used at interactive speeds for larger, roundish objects.

The following references describe the general level of art related to graph cuts, and each reference is hereby incorporated by reference: [1] Y. Boykov and M.-P. Jolly, Interactive organ segmentation using graph cuts. in *Medical Image Computing and Computer-Assisted Intervention*, Pittsburgh, Pa., October 2000, pp. 276-286; [2] Interactive graph cuts for optimal boundary & region segmentation of objects in N-D images, in *International Conference on Computer Vision*, vol. 1, July 2001, pp. 105-112; [3] Y. Boykov and V. Kolmogorov, An experimental comparison of mm-cut/max-flow algorithms for energy minimization in vision, in *IEEE transactions on Pattern Analysis and Machine Intelligence*, vol. 26, no. 9, pp. 1124-1137, September 2004; [4] Y. Sun, H. Lombaert, L. Grady, and C. Xu, One-click segmentation of left atrium using multi-resolution graph cuts, in Siemens Invention Disclosure 2004E09909US, 2004; [5] F. Harasy, Graph Theory. Addison-Wesley, 1994; [6] X. Han, C. Xu, and J. L. Prince, A topology preserving level set method for geometric deformable models, in *IEEE transactions on Pattern Analysis and Machine Intelligence*, vol. 25, no. 6, PP. 755-768, June 2003; [7] U. 'Trottenberg, C. W. Oosterlee, and A. Schuller, Eds., Multigrid. San Diego: Academic Press, 2000; [8] B. Gidas, A renormalization group approach to image processing problems, in *IEEE transactions on Pattern Analysis and Machine intelligence*, vol. 11, no. 2, pp. 164-180, February 1989; [9] P. Perez and F. Heitz, Restriction of a markov random field on a graph and multiresolution statistical image modeling, in *IEEE Trans. on Information Theory*, vol. 42, no. 1, pp. 180-190, January 1996; [10] N. Biggs, Algebraic Graph Theory, ser. Cambridge: Tracts in Mathematics. Cambridge University Press, 1974, no. 67.

Any reference to the term pixel herein shall also be deemed a reference to a voxel.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. A method of processing a set of image data, having a first plurality of nodes comprising:
   generating, by a computer, a first measure of affinity for each of a plurality of pairs of neighboring nodes in the first plurality of nodes;
   downsampling the first set of image data to generate a second plurality of nodes such that the second plurality of nodes has a fewer number of nodes than the first plurality of nodes;
   generating a second measure of affinity for each of a plurality of pairs of neighboring nodes in the second plurality of nodes, wherein the first measure of affinity for each of a plurality of pairs of neighboring nodes in the first plurality of nodes is used to calculate the second measure of affinity;
   determining if the second plurality of nodes meets a shape assumption; and
   using graph cuts to process the second plurality of nodes to segment an object in the set of image data.

2. The method as claimed in claim 1, further comprising processing the second plurality of nodes to generate information about the set of image data.

3. The method as claimed in claim 1, wherein the second plurality of nodes represents a second set of image data, further comprising:
- downsampling the second set of image data to generate a third plurality of nodes such that the third plurality of nodes has a fewer number of nodes than the second plurality of nodes; and
- generating a measure of affinity between neighboring pixels in the third plurality of nodes, the measure of affinity between neighboring nodes in the third plurality of nodes being based on the measure of affinity between neighboring nodes in the second plurality of nodes.

4. The method as claimed in claim 3, further comprising processing the third plurality of nodes to generate information about the set of image data.

5. The method as claimed in claim 3, further comprising processing the third plurality of nodes to segment an object in the set of image data.

6. The method as claimed in claim 1, wherein affinities are measured in the first plurality of nodes using an exponential function.

7. The method as claimed in claim 1, wherein there is a plurality of non-included nodes in the first plurality of nodes that are not in the second plurality of nodes, each of the plurality of non-included nodes being associated with a group of nodes in the second plurality of nodes, further comprising:
- assigning a non-included node to one of the group of nodes in the second plurality of nodes based on a measure of affinity along a path between the non-included node and each of the second plurality of nodes;
- repeating the previous step of assigning for each of the plurality of non-included nodes;
- determining a neighborhood for each of the second plurality of nodes such that two nodes in the second plurality of nodes are connected if any of the non-included nodes to which they are assigned are connected; and
- performing the assigning of the plurality of non-included nodes to the second plurality of nodes in such a manner that a lattice neighborhood structure is preserved.

8. The method as claimed in claim 7, further comprising determining the affinity between a first node and a second node in the second plurality of nodes by summing the measure of affinity between the first node and the second node determined in the association with the first plurality of nodes with the affinity between all non-included nodes assigned to the first node and the second node.

9. The method as claimed in claim 8, further comprising determining affinities between diagonal nodes in the second plurality of nodes.

10. The method as claimed in claim 1, further comprising steps for creating a foreground image separated from its background including:
- applying a graph cuts method to the second plurality of nodes;
- assigning foreground labels to a plurality of segmented nodes of the second plurality of nodes;
- creating an image wherein nodes of the second plurality with foreground labels are pixels of the image.

11. The method as claimed in claim 10, further comprising the steps:
- assigning a foreground label to nodes of the first plurality of nodes that correspond to the plurality of segmented nodes of the second plurality of nodes;
- creating an image wherein pixels are the nodes of the first plurality of nodes with foreground labels.

12. The method as claimed in claim 3, wherein a graph cuts segmentation is applied to the nodes of the third plurality of nodes.

13. The method as claimed in claim 12, wherein a foreground label is assigned to nodes of the first plurality of nodes corresponding to nodes in the third plurality of nodes having a foreground label after applying the graph cuts segmentation and an image is created wherein pixels of the image are the nodes of the first plurality of nodes with foreground labels.

14. The method as claimed in claim 1, wherein there is a plurality of non-included nodes in the first plurality of nodes that are not in the second plurality of nodes, each of the plurality of non-included nodes being associated with a group of nodes in the second plurality of nodes, further comprising assigning of the plurality of non-included nodes to the second plurality of nodes in such a manner that a lattice neighborhood structure is preserved.

15. A system for analyzing an image, comprising:
- a computer; and
- an image processing application loaded on the computer system;
- wherein the imaging processing application:
  - generates a first measure of affinity for each of a plurality of pairs of neighboring nodes in the first plurality of nodes;
  - downsamples the first set of image data to generate a second plurality of nodes such that the second plurality of nodes has a fewer number of nodes than the first plurality of nodes;
  - generates a second measure of affinity for each of a plurality of pairs of neighboring nodes in the second plurality of nodes, wherein the first measure of affinity for each of a plurality of pairs of neighboring nodes in the first plurality of nodes is used to calculate the second measure of affinity;
  - determines if the second plurality of nodes meets a shape assumption; and
  - uses graph cuts to process the second plurality of nodes to segment an object in the set of image data.

16. The system as claimed in claim 15, wherein the imaging processing application processes the second plurality of nodes to generate information about the set of image data.

17. The system as claimed in claim 15, wherein the second plurality of nodes represents a second set of image data and the imaging processing application downsamples the second set of image data to generate a third plurality of nodes such that the third plurality of nodes has a fewer number of nodes than the second plurality of nodes and generates a measure of affinity between neighboring nodes in the third plurality of nodes, the measure of affinity between neighboring nodes in the third plurality of nodes being based on the measure of affinity between neighboring nodes in the second plurality of nodes.

18. The system as claimed in claim 17, wherein the imaging processing application processes the third plurality of nodes to generate information about the set of image data.

19. The system as claimed in claim 17, wherein the imaging processing application processes the third plurality of nodes to segment an object in the set of image data.

20. The system as claimed in claim 15, wherein the imaging processing application measures affinities in the first plurality of nodes using an exponential function.

21. The system as claimed in claim 15, wherein there is a plurality of non-included nodes in the first plurality of nodes that are not in the second plurality of nodes, each of the plurality of non-included nodes being associated with a group of nodes in the second plurality of nodes, wherein the imaging processing application:

assigns a non-included node to one of the group of nodes in the second plurality of nodes based on a measure of affinity along a path between the non-included node and each of the second plurality of nodes;

repeats the previous step of assigning for each of the plurality of non-included nodes;

determines a neighborhood for each of the second plurality of nodes such that two nodes in the second plurality of nodes are connected if any of the non-included nodes to which they are assigned are connected; and performs the assigning of the plurality of non-included nodes to the second plurality of nodes in such a manner that a lattice neighborhood structure is preserved.

22. The system as claimed in claim 21, wherein the imaging processing application determines the affinity between a first node and a second node in the second plurality of nodes by summing the measure of affinity between the first node and the second node determined in the association with the first plurality of nodes with the affinity between all non-included nodes assigned to the first node and the second node.

23. The system as claimed in claim 22, wherein the imaging processing application determines affinities between diagonal nodes in the second plurality of nodes.

* * * * *